US008090688B2

(12) United States Patent
Petri

(10) Patent No.: US 8,090,688 B2
(45) Date of Patent: Jan. 3, 2012

(54) INDICATING REVIEW ACTIVITY OF A DOCUMENT IN A CONTENT MANAGEMENT SYSTEM

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 11/847,112

(22) Filed: Aug. 29, 2007

(65) Prior Publication Data

US 2009/0063535 A1    Mar. 5, 2009

(51) Int. Cl.
*G06F 17/30* (2006.01)
(52) U.S. Cl. ........ 707/634; 707/600; 707/912; 707/821; 709/224
(58) Field of Classification Search .................. 707/600, 707/634, 912, 821; 709/224
See application file for complete search history.

(56) References Cited

U.S. PATENT DOCUMENTS

| | | | |
|---|---|---|---|
| 6,182,080 B1 * | 1/2001 | Clements | 707/102 |
| 2003/0158855 A1 * | 8/2003 | Farnham et al. | 707/102 |
| 2005/0216443 A1 * | 9/2005 | Morton et al. | 707/3 |
| 2007/0088751 A1 * | 4/2007 | DeFelice et al. | 707/104.1 |
| 2007/0106793 A1 * | 5/2007 | Bernard et al. | 709/224 |

OTHER PUBLICATIONS

"IBM Solution for Compliance in a Regulated Environment", pp. 1-2, printed Aug. 28, 2007 at http://www-111.ibm.com/ecatalog/Detail.wss?locale=en_US&synkey=Q350230E11899L68.
"Enterprise Content Management Solutions", p. 1, printed Aug. 28, 2007 at http://www.opentext.com.
"EMC—Where Information Lives", pp. 1-3, printed on Aug. 28, 2007 at http://software.emc.com/products/content_management/content_management.htm.

* cited by examiner

*Primary Examiner* — Frantz Coby
(74) *Attorney, Agent, or Firm* — Martin & Associates LLC; Derek P. Martin

(57) ABSTRACT

A content management system (CMS) monitors and logs review activity for elements in a document. A review activity policy includes one or more thresholds that define one or more ranges that define corresponding review activity levels. A schema or document type for the document is annotated based on the logged review activity to indicate one or more review activity levels for one or more elements in the schema or document type. When an author edits or creates a document based on the same schema or document type, the schema or document type for that document is read, and the elements in the document are displayed to the user to indicate past review activity according to the annotations in the document's schema or document type.

19 Claims, 8 Drawing Sheets

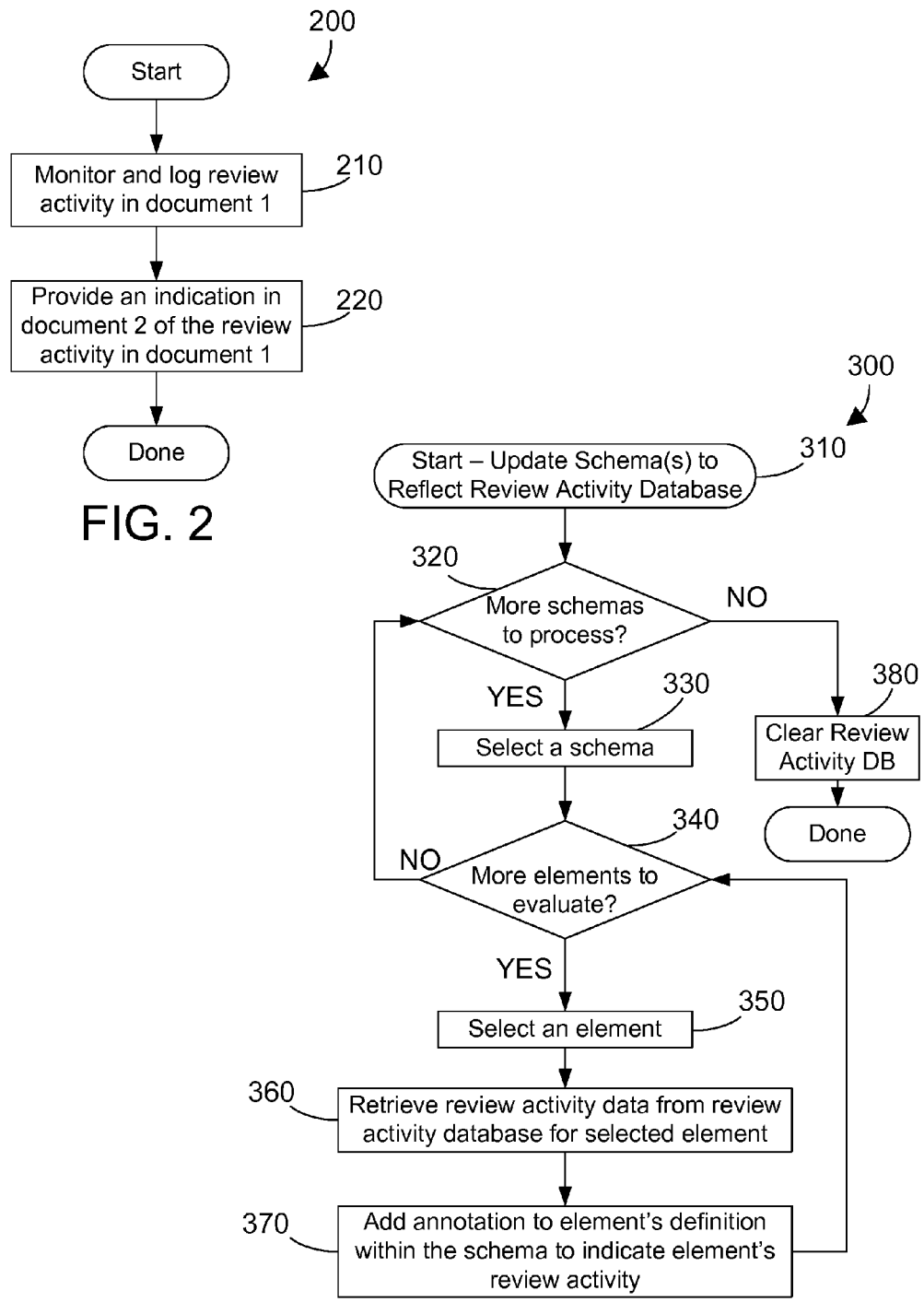

```
object_id: 0
<DrugLabel>
    <Name>Sneeze Free</Name>
    <Description>This drug cures the common cold.</Description>
    <ChemicalDetails>
        < EmpiricalFormula >ABC-Formula</EmpiricalFormula>
        <ActiveIngredients>
            ABC, DEF, GHI, JKL, XYZ
        </ActiveIngredients>
        <InactiveIngredients>
            MNO, PQR, STU, VWX
        </InactiveIngredients>
    </ChemicalDetails>
</DrugLabel>
```

FIG. 6

```
object_id: 1
<DrugLabel>
    <Name>Cough Free</Name>
    <Description>This drug gets rid of that nagging cough.</Description>
    <ChemicalDetails>
        < EmpiricalFormula >KLM-Formula</EmpiricalFormula>
        <ActiveIngredients>
            NOP,QRS,TUV
        </ActiveIngredients>
        <InactiveIngredients>
            BCD,EFG,HIJ
        </InactiveIngredients>
    </ChemicalDetails>
</DrugLabel>
```

FIG. 7

```
object_id: 2
<DrugLabel>
    <Name>Ache Free</Name>
    <Description>This drug gets rid of painful headaches.</Description>
    <ChemicalDetails>
        < EmpiricalFormula >STU-Formula</EmpiricalFormula>
        <ActiveIngredients>
            RLD,JKL,BKL
        </ActiveIngredients>
        <InactiveIngredients>
            BCD,EFG,HIJ
        </InactiveIngredients>
    </ChemicalDetails>
</DrugLabel>
```

FIG. 8

```
<xsd:schema xmlns:xsd "http://www.w3.org/2001/XMLSchema">
  <xsd:element name "DrugLabel">
    <xsd:complexType>
      <xsd:sequence>
        <xsd:element name "Name" type "xsd:string" />
        <xsd:element name "Description" type "xsd:string">
      </xsd:element>
            <xsd:element name "ChemicalDetails">
              <xsd:complexType>
                <xsd:sequence>
                   <xsd:element name "EmpiricalFormula" type "xsd:string">
                   </xsd:element>
                   <xsd:element name "ActiveIngredients" type "xsd:string">
                   </xsd:element>
                   <xsd:element name "InactiveIngredients" type "xsd:string">
                   </xsd:element>
                </xsd:sequence>
              </xsd:complexType>
            </xsd:element>
      </xsd:sequence>
    </xsd:complexType>
  </xsd:element>
</xsd:schema>
```

FIG. 9

| Element | Annotations | Revisions |
|---|---|---|
| /DrugLabel/Name | 2 | 1 |
| /DrugLabel/Description | 3 | 3 |
| /DrugLabel/ChemicalDetails/EmpericalFormula | 12 | 15 |
| /DrugLabel/ChemicalDetails/ActiveIngredients | 10 | 8 |
| /DrugLabel/ChemicalDetails/InactiveIngredients | 5 | 5 |

FIG. 10

| Review Activity Indication | Threshold |
|---|---|
| HIGH | `<Condition operator="OR">`<br>　`<Condition type="annotations" operator="GT">`<br>　　`<Value val="10"/>`<br>　`</Condition>`<br>　`<Condition type="revisions" operator="GT">`<br>　　`<Value val="5"/>`<br>　`</Condition>`<br>`</Condition>` |
| MEDIUM | `<Condition operator="OR">`<br>　`<Condition type="annotations" operator="GT">`<br>　　`<Value val="5"/>`<br>　`</Condition>`<br>　`<Condition type="revisions" operator="GT">`<br>　　`<Value val="2"/>`<br>　`</Condition>`<br>`</Condition>` |

FIG. 11

```xml
<xsd:schema xmlns:xsd="http://www.w3.org/2001/XMLSchema">
  <xsd:element name="DrugLabel">
    <xsd:complexType>
      <xsd:sequence>
        <xsd:element name="Name" type="xsd:string" />
        <xsd:element name="Description" type="xsd:string">
          <xsd:annotation>
            <xsd:appinfo>
              <ReviewActivityIndication degree="MEDIUM"/>    ←—1210
            </xsd:appinfo>
          </xsd:annotation>
        </xsd:element>
        <xsd:element name="ChemicalDetails">
          <xsd:complexType>
            <xsd:sequence>
              <xsd:element name="EmpiricalFormula" type="xsd:string">
                <xsd:annotation>
                  <xsd:appinfo>
                    <ReviewActivityIndication degree="HIGH"/>    ←—1220
                  </xsd:appinfo>
                </xsd:annotation>
              </xsd:element>
              <xsd:element name="ActiveIngredients" type="xsd:string">
                <xsd:annotation>
                  <xsd:appinfo>
                    <ReviewActivityIndication degree="HIGH"/>    ←—1230
                  </xsd:appinfo>
                </xsd:annotation>
              </xsd:element>
              <xsd:element name="InactiveIngredients" type="xsd:string">
                <xsd:annotation>
                  <xsd:appinfo>
                    <ReviewActivityIndication degree="MEDIUM"/>  ←—1240
                  </xsd:appinfo>
                </xsd:annotation>
              </xsd:element>
            </xsd:sequence>
          </xsd:complexType>
        </xsd:element>
      </xsd:sequence>
    </xsd:complexType>
  </xsd:element>
</xsd:schema>
```

INDICATING REVIEW ACTIVITY OF A DOCUMENT IN A CONTENT MANAGEMENT SYSTEM

BACKGROUND

1. Technical Field

This disclosure generally relates to content management systems, and more specifically relates to indicating review activity of a document in a content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

In a CMS environment, workflows are often used to facilitate the review and approval process of content in a document. When a document goes through a review and approval workflow, each of the elements that make up the document may be reviewed and approved independently before the document is approved as a whole. During this process reviewers can log their comments as annotations for each element. Some elements in the document may have more annotations or revisions than others. For example, if an element contains important or complex information, it is more likely to be highly scrutinized by reviewers than a standard element, such as a copyright statement. In the prior art, when a user creates a new document in a content management system, the user has no idea whether elements similar to the ones they are creating or linking to in the document have been subjected to significant or minimal annotations or revisions in previous documents of the same type. Without a way to indicate to a user review activity of past documents when creating a new document or rendering an existing document of the same type, known content management systems will not provide such indications to a user and thus the user may not be aware of potential review activity for a given element.

BRIEF SUMMARY

A content management system (CMS) monitors and logs review activity for elements in a document. A review activity policy specifies one or more thresholds that define one or more ranges that define corresponding review activity levels. A schema or document type definition for the document is annotated based on the logged review activity and the review activity policy to indicate one or more review activity levels for one or more elements in the schema. When an author edits or creates a document, the schema for that document is read, and the elements in the document are displayed to the user to indicate past review activity according to the annotations in the document's schema. For example, these indications make the user aware of elements in the document that may be more highly scrutinized in a future review of the document.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 2 is a flow diagram of a method for indicating review activity for a first document in a second document;

FIG. 3 is a flow diagram of a method for adding annotations to a schema for a document to indicate review activity for one or more element definitions;

FIGS. 6-8 show sample XML documents in the repository that have been reviewed and approved;

FIG. 9 shows a sample XML schema defined for documents 600, 700, and 800 shown in FIGS. 6-8;

FIG. 10 shows a sample set of review activity data;

FIG. 11 shows a sample review activity policy;

FIG. 12 shows the sample XML schema shown in FIG. 9 after annotations denoting review activity have been inserted.

DETAILED DESCRIPTION

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
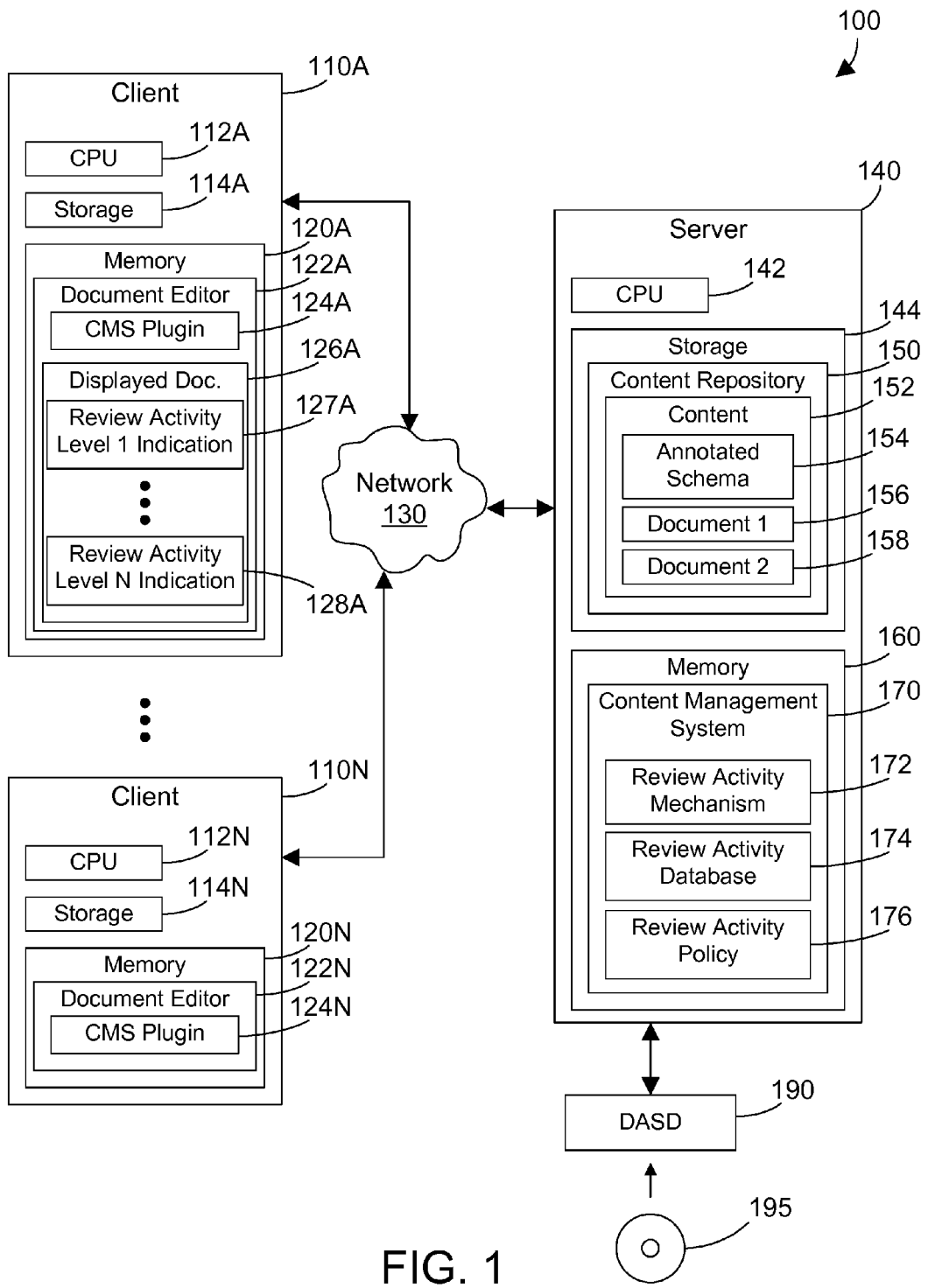
FIG. 1 is a block diagram of a networked computer system that includes a server computer system that has a content management system that includes a review activity mechanism that monitors review activity of the documents in the repository and displays the review activity to the user when the user edits or displays a document or creates a new document.

Referring to FIG. 1, networked computer system 100 includes multiple clients, shown in FIG. 1 as clients 110A, . . . , 110N, coupled to a network 130. Each client preferably includes a CPU, storage, and memory that contains a document editor, and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

A document may be displayed in the document editor 122A in FIG. 1, as shown by displayed document 126A. Displayed document 126A may include any suitable number and types of review activity indications. For the specific example in FIG. 1, displayed document 126A includes multiple review activity level indications, as shown by review activity level 1 indication 127A through review activity level N indication 128A.

The CMS 170 resides in the main memory 160 of a server computer system 140 that also includes a CPU 142 and storage 144 that includes a content repository 150 that holds content 152 managed by the CMS 170. Content 152 may include one or more schemas, including one or more annotated schemas 154, and documents such as document 156 and document 158 in FIG. 1. As used in the disclosure and claims herein, the term "document" means any type of data that may be managed by a content management system, including all known types of data and objects as well as those developed in the future, and the term "element" means any section or portion of a document that may be individually displayed or accentuated, whether actually in the document or linked to from the document. As used in the disclosure and claims herein, the term "annotated schema" means a schema that has had annotations regarding review activity for one or more documents that are instance of the schema. In the most preferred implementation, the annotations are added to the schema itself. However, it is equally within the scope of the disclosure and claims herein to provide schema annotations in storage external to the schema itself, including without limitation a file, a database table, an internal web site, and an external web site. In addition, a second document is of the same type or similar type as a first document when the first document and second document had the same corresponding schema or document type definition.

One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a review activity mechanism 172, a review activity database 174, and a review activity policy 176. Review activity mechanism 172 monitors review activity for documents in the repository and logs the review activity in review activity database 174. Review activity mechanism 172 also annotates schemas to generate annotated schemas such as 154 according to review activity policy 176. Review activity policy 176 contains one or more thresholds that define one or more ranges for review activity that determine how review activity mechanism 172 inserts annotations into a schema to generate annotated schema 154 according to review activity data 174. Once the schema is annotated, when a document of that type is created, edited or viewed, the document may be rendered with indications of review activity to indicate to the user which elements have been reviewed the most in previous documents. This allows the user to focus on the elements that have been reviewed the most in previous documents to ensure the elements are as correct as possible before submitting the document for review.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load computation-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The CMS herein may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Referring to FIG. 2, a method 200 shows the steps for displaying review activity in a document. First, the review activity for a first document (e.g., document 156 in FIG. 1) is monitored (step 210). Then a review activity level indication in a displayed document of the same type (e.g., 126A, which could be a display of document 158 in FIG. 1) is provided (step 220) and method 200 is done.

Referring to FIG. 3, a method 300 begins when one or more schemas need to be updated to reflect review activity (step 310). The decision to update schemas may be done in any suitable way, including a periodic process requesting the update and a user requesting the update. If there are more schemas to process (step 320=YES) then a schema is selected (step 330). If there are more element definitions from the schema that need to be evaluated (step 340=YES) then an element is selected (step 350). The review activity data for the selected element is retrieved from the review activity database (step 360). An annotation is added to the selected element's definition within the schema to indicate the element's review activity (step 370). Method 300 determines if there are more elements that need to be evaluated (step 340). If there are no more elements that need to be evaluated (step 340=NO), then method 300 determines if there are more schemas to process (step 320). If there are no more schemas to process (step 320=NO), the review activity database is cleared (step 380), then method 300 is done. Note that the clearing of the review activity database in step 380 is optional. For example, the database may be cleared at defined times (e.g. at the end of a review cycle) to ensure the most up to date data is used. Instead, the review activity database could have records marked that indicate they have already been processed using method 300 in FIG. 3.

Figure 4:
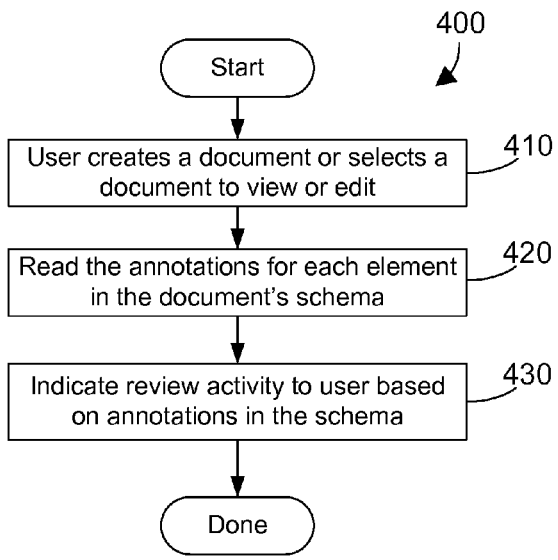
FIG. 4 is a flow diagram of a method for indicating review activity for a first document in the display of a second document to a user.

Referring to FIG. 4, a method 400 for displaying review activity to a user begins with a user creating a document or selecting a document to view or edit (step 410). The annotations are read for each element in the document's schema (step 420). Then the review activity is indicated to the user based on the annotations in the schema (step 430). The indication in step 430 can be performed in any suitable way, including, but not limited to, an audio indication, a visual indication, or both.

Figure 5:
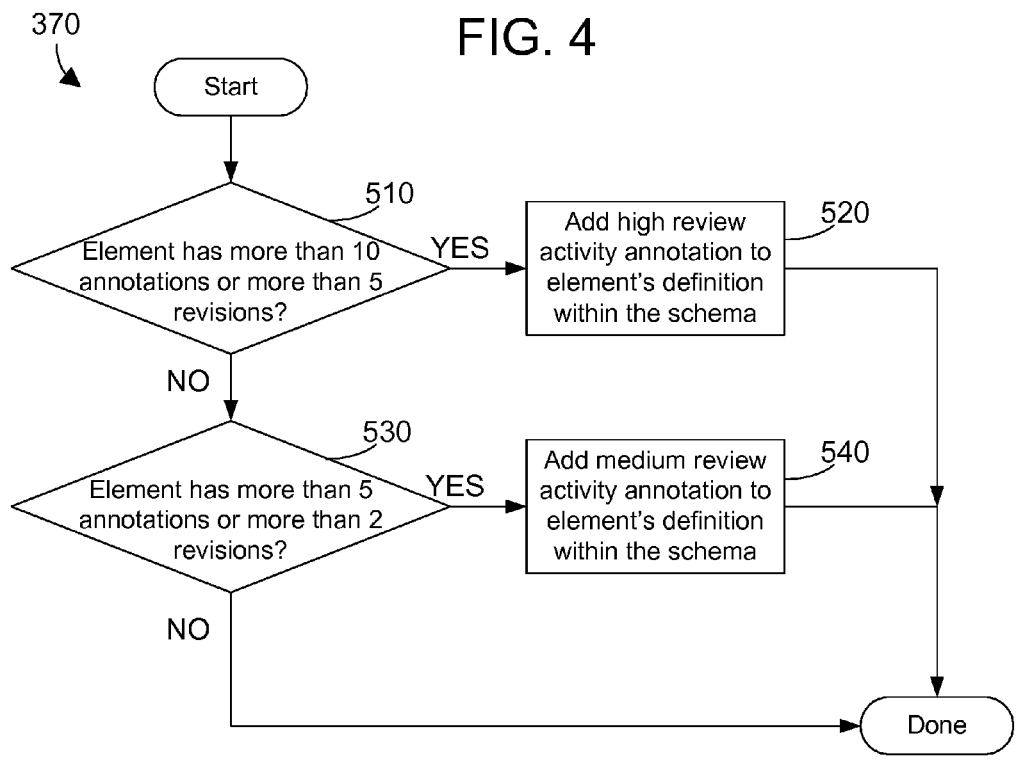
FIG. 5 is a flow diagram of one suitable implementation for step 370 in FIG. 3.

FIG. 5 shows one suitable implementation for step 370 in FIG. 3. If the selected element has more than 10 annotations or more than 5 revisions (step 510=YES), then a high review activity annotation is added to the selected element's definition within the schema (step 520). If the selected element does not have more than 10 annotations or more than 5 revisions (step 510=NO) then method 370 goes to step 530. If the selected element has more than 5 annotations or more than 2 revisions (step 530=YES), then a medium review activity annotation is added to the selected element's definition within the schema (step 540). If the selected element does not have more than 5 annotations or more than 2 revisions (step 530=NO), then the method is done. In the specific method 370 in FIG. 5, multiple thresholds define ranges for annotating a schema based on logged review activity. For this specific example, the defined ranges are shown in Table 1 below. Note the information in Table 1 below and in FIG. 5 shows thresholds and ranges that may be defined in review activity policy 176 in FIG. 1.

TABLE 1

| Activity | Annotation |
|---|---|
| >10 annotations OR >5 revisions | HIGH |
| >5 annotations OR >2 revisions | MEDIUM |
| 0-5 annotations AND 0-2 revisions | LOW |

A simple example is now provided to illustrate many of the concepts described above. FIGS. 6-8 are sample XML documents residing in content repository 150 shown in FIG. 1. Notice that document 600, document 700, and document 800 shown in FIGS. 6-8 are all of type DrugLabel, and as such, each of the documents 600, 700, and 800 correspond to the same schema 900 shown in FIG. 9. As each of the documents 600, 700, and 800 are in the process of being reviewed and approved, review activity mechanism 172 monitors and logs the review activity for each individual element within the documents (step 210 in FIG. 2). Table 1000 shown in FIG. 10 is one suitable example of the review activity database 174 in FIG. 1. Table 1000 contains a sample collection of review events for documents 600, 700, and 800.

Referring to FIG. 11, table 1100 is one suitable example for review activity policy 176 in FIG. 1 for the DrugLabel schema 900 shown in FIG. 9. Review activity policy 176 includes multiple thresholds that define multiple ranges that determine the review activity annotation that should be added in the schema for each element. The defined thresholds and ranges in table 1100 are the same as shown in method 370 in FIG. 5 and in Table 1 above.

After table 1100 has been populated with data, an indication can be received to update one or more schemas to reflect the review activity logged to the review activity database (step 310 in FIG. 3). Each element is selected (step 350 in FIG. 3) and the review activity data is retrieved from the review activity database for each element (step 360 in FIG. 3). An annotation is added for each element in the schema to indicate the element's review activity (step 370 in FIG. 3). For this specific example, if the element has more than 10 annotations or more than 5 revisions (step 510=YES in FIG. 5) then a high review activity annotation is added to the element's schema definition (step 520 in FIG. 5). If the element has 5-10 annotations or 2-5 revisions (step 530=YES in FIG. 5), then a medium review activity annotation is added to the element's schema definition (step 540 in FIG. 5). If the element has less than 5 annotations and less than 2 revisions (step 530=NO in FIG. 5), then no review activity annotation is added.

For the example herein, a low review activity annotation is not added to the document's schema. The low review activity indication is assumed to be the default display, and every element without a medium or a high activity indication is assumed to have low review activity. Another suitable implementation includes inserting a low review activity annotation for every element that does not have a high or medium review activity annotation. The scope of the disclosure and claims herein include all methods for providing any suitable number and type of annotations to the schema, whether in the schema itself or stored external to the schema, that reflect review activity for documents that are instances of the schema.

A sample annotated schema 1200 is shown for this example in FIG. 12, and is one suitable example of annotated schema 154 in FIG. 1. Annotated schema 1200 in FIG. 12 shows the annotations added as a result of performing the method 370 of FIG. 5. Notice that the Name element does not have a review activity annotation. In another suitable implementation, a low review activity annotation could be added for the Name element. In table 1000 in FIG. 10, the Name element was annotated 2 times and revised 1 time. The Name element does not meet either threshold as defined in review activity policy 1100 in FIG. 11, and therefore, no annotation is added (step 530=NO in FIG. 5). The Description element in table 1000 in FIG. 10 had 3 annotations and 3 revisions (step 530=YES in FIG. 5), so a medium review activity annotation 1210 is added to the Description element (step 540 in FIG. 5). The EmpiricalFormula element had 12 annotations and 15 revisions (step 510=YES in FIG. 5), so a high review activity annotation 1220 is added to the EmpiricalFormula element (step 520 in FIG. 5). The ActiveIngredients element had 10 annotations and 8 revisions (step 510=YES in FIG. 5), so a high review activity annotation 1230 is added to the ActiveIngredients element (step 520 in FIG. 5). The InactiveIngredients element had 5 annotations and 5 revisions (step 530=YES in FIG. 5), so a medium review activity annotation 1240 is added to the InactiveIngredients element (step 540 in FIG. 5).

Figure 13:
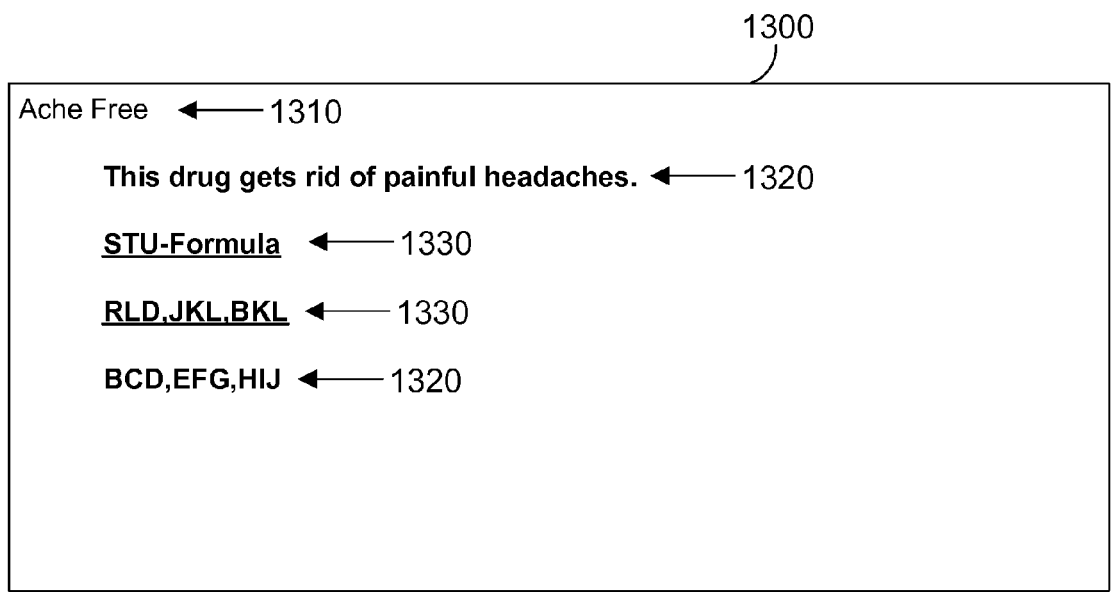
FIG. 13 shows the display of document 800 in FIG. 8 with indications of review activity.

We now assume a user selects document 800 in FIG. 8 for display (step 410 in FIG. 4). The annotations 1210, 1220, 1230, and 1240 in annotated schema 1200 for document 800 are read (step 420 in FIG. 4). The displayed document with review activity level indications is shown as document 1300 in FIG. 13. The Name element is rendered with a low review activity indication, shown in FIG. 13 by normal text at 1310. The Description and InactiveIngredients elements will be rendered with a medium review activity indication, shown in FIG. 13 by bold text 1320. The EmpiricalFormula and ActiveIngredients elements will be rendered with a high review activity indication, shown in FIG. 13 by bold and underlined text 1330.

While the specific example herein shows elements all contained within each document for the sake of clarity, it is equally within the scope of the preferred embodiments to provide indications in a schema for elements (or chunks) that are linked into the document as well.

The review activity indications include any suitable way to indicate review activity in a document. One suitable implementation renders a colored box of different colors behind each element. For example, an element with a low review activity indication could be rendered with a green box behind it, an element with a medium review activity indication could be rendered with a yellow box behind it, and an element with a high review activity indication could be rendered with a red box behind it. Other suitable implementations include, but are not limited to, different sounds for each type of review activity indication, a different colored or textured border around each element, and the text for each element being rendered in a different manner. In the alternative, an icon, button, menu item, etc. could be provided near an element for a user to click to display a list of annotations or revisions for the element. This could provide, for example, not only an indication of quantity of review activity, but an indication of the type of review activity as well. Thus, if a particular element has been annotated eight times and revised twice, the actual number of annotations and revisions could be displayed.

Note the review activity monitor in the most preferred implementation can be turned on and off by a user. For example, the user preferences in the editor may include a setting that the user may select to enable the display of review information in a document, and a setting that the user may select to disable the display of review information in a document, thereby giving the user control regarding whether or not the indications of review activity are displayed or not.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

What is claimed is:

1. An apparatus comprising:
   at least one processor;
   a memory coupled to the at least one processor; and
   a content management system residing in the memory and executed by the at least one processor, the content management system comprising a review activity mechanism that monitors review activity of at least one user in reviewing a first document that is a first instance of a schema that defines elements and attributes for documents that are instances of the schema, annotates the schema to reflect the review activity of the at least one user in reviewing the first document, and provides in a display of a second document that is a second instance of the schema at least one indication of the review activity of the at least one user in reviewing the first document according to the annotated schema.

2. The apparatus of claim 1 wherein the first document comprises a plurality of elements.

3. The apparatus of claim 1 wherein the actions performed by the at least one user in reviewing the first document include revising the first document and annotating the first document.

4. The apparatus of claim 1 wherein the at least one indication is selected from:
   an audio indication; and
   a visual indication.

5. The apparatus of claim 1 wherein the at least one indication depends on a review activity policy that specifies at least one criterion for indicating in the second document the review activity of the at least one user in reviewing the first document.

6. The apparatus of claim 1 wherein the review activity mechanism monitors review activity of a first user in annotating and revising the first document, monitors review activity of a second user in annotating and revising the first document, annotates the schema to reflect the review activity of the first and second users in annotating and revising the first document, and provides in the display of the second document at least one indication of the review activity of the first user and the second user in annotating and revising the first document.

7. A computer-implemented method for indicating review activity of a first document in a second document, the method comprising the steps of:
   (A) providing at least one processor;
   (B) providing a memory coupled to the at least one processor;
   (C) monitoring review activity of at least one user in reviewing the first document that is a first instance of a schema that defines elements and attributes for documents that are instances of the schema;
   (D) annotating the schema to reflect the review activity of the at least one user in reviewing the first document monitored in step (C); and
   (E) providing in a display of the second document that is a second instance of the schema at least one indication of the review activity of the at least one user in reviewing the first document according to the schema annotated in step (D).

8. The method of claim 7 wherein the first document comprises a plurality of elements.

9. The method of claim 7 wherein the actions performed by the at least one user in reviewing the first document include revising the first document and annotating the first document.

10. The method of claim 7 wherein the at least one indication is selected from:
   an audio indication; and
   a visual indication.

11. The method of claim 7 wherein the at least one indication depends on a policy that specifies at least one criterion for indicating in the second document the review activity of the at least one user in reviewing the first document.

12. The method of claim 7 wherein step (C) monitors review activity of a first user in annotating and revising the first document and monitors review activity of a second user in annotating and revising the first document, wherein step (C) annotates the schema to reflect the review activity of the first and second users, and wherein step (D) provides in the display of the second document at least one indication of the review activity of the first user and the second user in annotating and revising the first document.

13. A computer-implemented method for indicating in a second XML document review activity of a first XML document, the method comprising the steps of:
   monitoring activity of a first user in reviewing and revising the first XML document;
   monitoring activity of a second user in reviewing and revising the first XML document;
   logging the activity by the first and second users for each element in the first XML document to a review activity database that includes annotations for all elements in the first XML document annotated by the first user and annotated by the second user, and includes revisions for all elements in the first XML document revised by the first user and revised by the second user;
   reading a review activity policy that specifies a high review activity indication with corresponding high annotation criteria comprising a first user-defined range and high revision criteria comprising a second user-defined range, that specifies a medium review activity indication with corresponding medium annotation criteria comprising a third user-defined range and medium revision criteria comprising a fourth user-defined range;
   annotating an XML schema for the first and second XML documents, the XML schema defining elements and attributes for documents that are instances of the XML schema, wherein the first and second XML documents are instances of the XML schema, the step of annotating the XML schema comprising the steps of:
      inserting a high review activity annotation in the XML schema for the first document for each element that has annotation activity in the first user-defined range in the review activity database;
      inserting a high review activity annotation in the XML schema for the first document for each element that has revision activity in the second user-defined range in the review activity database;
      inserting a medium review activity annotation in the XML schema for the first document for each element that has annotation activity in the third user-defined range in the review activity database;
      inserting a medium review activity annotation in the XML schema for the first document for each element that has revision activity the a fourth user-defined range in the review activity database; and
      inserting a low review activity annotation in the XML schema for the first document for each element that has annotation activity in a fifth user-defined range in the review activity database and revision activity in a sixth user-defined range in the review activity database;
   creating the second document that corresponds to the annotated XML schema;
   rendering the second document to a user with indications in the second document, the indications comprising:
      a first visual indication corresponding to each element that has a low review activity annotation in the XML schema;
      a second visual indication corresponding to each element that has a medium activity annotation in the XML schema; and
      a third visual indication corresponding to each element that has a high activity annotation in the XML schema.

14. An article of manufacture comprising:
   (A) a content management system comprising:
      a review activity mechanism that monitors review activity of at least one user in reviewing a first document that is a first instance of a schema that defines elements and attributes for documents that are instances of the schema, annotates the schema to reflect the review activity of the at least one user in reviewing the first document, and provides in a display of a second document that is a second instance of the schema at least one indication of the review activity of the at least one user in reviewing the first document according to the annotated schema; and
   (B) recordable media bearing the content management system.

15. The article of manufacture of claim 14 wherein the first document comprises a plurality of elements.

16. The article of manufacture of claim 14 wherein the actions performed by the at least one user include revising the first document and annotating the first document.

17. The article of manufacture of claim 14 wherein the at least one indication is selected from:
   an audio indication; and
   a visual indication.

18. The article of manufacture of claim 14 wherein the at least one indication depends on a review activity policy that specifies at least one criterion for indicating in the second document the review activity of the at least one user in reviewing the first document.

19. The article of manufacture of claim 14 wherein the review activity mechanism monitors review activity of a first user in annotating and revising the first document, monitors review activity of a second user in annotating and revising the first document, annotates the schema to reflect the review activity of the first and second users in annotating and revising the first document, and provides in the display of the second document at least one indication of the review activity of the first user and the second user in annotating and revising the first document.

* * * * *